(12) United States Patent
Sato et al.

(10) Patent No.: US 6,648,660 B2
(45) Date of Patent: Nov. 18, 2003

(54) CARD CONNECTOR HAVING IMPROVED SUPPORT MEMBER FOR EJECT MECHANISM

(75) Inventors: Shigeru Sato, Chiba (JP); Kiyoshi Abe, Tokyo (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 10/102,826

(22) Filed: Mar. 22, 2002

(65) Prior Publication Data

US 2002/0155739 A1 Oct. 24, 2002

(30) Foreign Application Priority Data

Mar. 23, 2001 (JP) ........................................ 2001-085758

(51) Int. Cl.⁷ ............................................... H01R 13/62
(52) U.S. Cl. ...................... 439/159; 439/310; 439/333; 439/345
(58) Field of Search ................................ 439/159, 310, 439/333, 345

(56) References Cited

U.S. PATENT DOCUMENTS

| | | |
|---|---|---|
| 4,810,200 A | 3/1989 | Sakamoto |
| 4,952,161 A | 8/1990 | Komatsu |
| 5,033,972 A | 7/1991 | Komatsu et al. |
| 5,051,101 A | 9/1991 | Komatsu |
| 5,145,389 A | 9/1992 | Okubo |
| 5,179,505 A | 1/1993 | Matsuo |
| 5,197,894 A | 3/1993 | Koike |
| 5,286,207 A | 2/1994 | McHugh |
| 5,492,480 A | 2/1996 | Fusselman et al. |
| 5,492,481 A | 2/1996 | Lewis |
| 5,533,906 A | 7/1996 | Abe |
| 5,597,316 A * | 1/1997 | David et al. ................. 361/754 |
| 5,640,307 A | 6/1997 | Bleier et al. |

(List continued on next page.)

FOREIGN PATENT DOCUMENTS

| | | |
|---|---|---|
| JP | 11-316110 | 11/1999 |
| JP | 2000-251024 | 9/2000 |
| JP | 2000-251025 | 9/2000 |
| JP | 2000-277207 | 10/2000 |

OTHER PUBLICATIONS

U.S. patent application Ser. No. 09/832,190, T. Takada et al., filed Apr. 11, 2001.

(List continued on next page.)

*Primary Examiner*—P. Austin Bradley
*Assistant Examiner*—Edwin A. Léon
(74) *Attorney, Agent, or Firm*—Finnegan, Henderson, Farabow, Garrett & Dunner, LLP (57) ABSTRACT

The present invention provides a card connector which prevents the retainer fitting from coming off even when the molded base plate is deformed during reflow soldering and which can be reduced in size, height and weight. The card connector includes a shell body and a molded base plate. The molded base plate includes at least a card eject mechanism incorporating a compression coil spring for inserting/ejecting a card and a retainer fitting for holding the card eject mechanism pushed by the compression coil spring. The shell body is formed with at least one engagement hole for engagement with at least one hook portion of the retainer fitting. The retainer fitting includes a horizontal member and a vertical member rising vertically from the horizontal member. The horizontal member and/or vertical member have at least one pair of press-fit projections and one hook portion.

5 Claims, 6 Drawing Sheets

U.S. PATENT DOCUMENTS

| | | |
|---|---|---|
| 5,648,651 A | 7/1997 | Inoue |
| 5,655,918 A | 8/1997 | Soh |
| 5,674,080 A | 10/1997 | Takemura |
| 5,695,351 A * | 12/1997 | Kimura et al. ............... 439/159 |
| 5,703,346 A | 12/1997 | Bricaud et al. |
| 5,725,385 A | 3/1998 | Takano et al. |
| 5,740,012 A | 4/1998 | Choi |
| 5,871,365 A * | 2/1999 | Kajiura ........................ 439/159 |
| 5,890,920 A | 4/1999 | David et al. |
| 5,899,763 A | 5/1999 | Kajiura |
| 5,923,541 A | 7/1999 | Yasumi |
| 5,967,810 A | 10/1999 | Spickler et al. |
| 6,065,984 A | 5/2000 | Tung |
| 6,083,018 A | 7/2000 | Hara et al. |
| 6,095,834 A | 8/2000 | Lai et al. |
| 6,106,313 A | 8/2000 | Chen |
| 6,120,309 A | 9/2000 | Hara |
| 6,139,340 A | 10/2000 | Niitsu |
| 6,152,748 A | 11/2000 | Sato et al. |
| 6,159,027 A | 12/2000 | Kuo |
| 6,162,075 A | 12/2000 | Hara et al. |
| 6,174,197 B1 | 1/2001 | Hirata et al. |
| 6,200,148 B1 | 3/2001 | Yu |
| 6,210,187 B1 | 4/2001 | Tung |
| 6,227,879 B1 | 5/2001 | Dong |
| 6,231,360 B1 | 5/2001 | Horie |
| 6,234,813 B1 | 5/2001 | Hanyu |
| 6,270,365 B1 | 8/2001 | Nishioka |
| 6,273,737 B1 | 8/2001 | Furusho et al. |
| 6,290,136 B1 | 9/2001 | Koseki et al. |
| 6,299,465 B1 | 10/2001 | Hirata |
| 6,302,715 B1 | 10/2001 | Sato et al. |
| 6,319,029 B2 * | 11/2001 | Nishioka .................... 439/159 |
| 6,332,790 B1 | 12/2001 | Ishikawa et al. |
| 6,390,836 B1 * | 5/2002 | Motegi et al. ............... 439/159 |
| 6,394,827 B2 | 5/2002 | Nogami |
| 6,398,567 B1 * | 6/2002 | Nishimura .................. 439/159 |
| 6,398,827 B1 | 6/2002 | Ota et al. |

OTHER PUBLICATIONS

U.S. patent application Ser. No. 09/978,660, S. Sato, filed Oct. 18, 2001.

U.S. patent application Ser. No. 09/978,661, S. Sato, filed Oct. 18, 2001.

U.S. patent application Ser. No. 10/067,404, M. Ooya et al., filed Feb. 7, 2002.

U.S. patent application Ser. No. 10/090,153, T. Ito et al., filed Mar. 5, 2002.

U.S. patent application Ser. No. 10/102,928, K. Abe, filed Mar. 22, 2002.

U.S. patent application Ser. No. 09/914,322, S. Saton, filed Aug. 27, 2001.

* cited by examiner

CARD CONNECTOR HAVING IMPROVED SUPPORT MEMBER FOR EJECT MECHANISM

This application is based on Patent Application No. 2001-085758 filed Mar. 23, 2001 in Japan, the content of which is incorporated hereinto by reference.

BACKGROUND OF THE INVENTION

1. Field of the Invention

The present invention relates to a card connector mounted on electronic devices, such as cellular phones, telephones, PDAs (personal digital assistants), portable audio devices and cameras, and more specifically to a card connector which keeps a retainer fitting for a compression coil spring from being dislocated and thereby prevents the compression coil spring forming a card eject mechanism from coming out of the card connector even when a molded base plate of the connector is deformed as the card connector is performed a reflow-soldering to a printed circuit board of the electronic device.

2. Description of the Related Art

In electronic devices such as cellular phones, telephones, PDAs and cameras, a variety of functions are added by inserting an IC card with a built-in CPU or memory IC, such as a SIM (subscriber identity module) card, an MMC (multimedia card), an SD (secure digital) card, a Memory Stick (tradename) and a Smart Media (tradename).

Many of the card connectors mounted on such electronic devices have an eject mechanism for removing an inserted card from the connector.

Figure 5A:
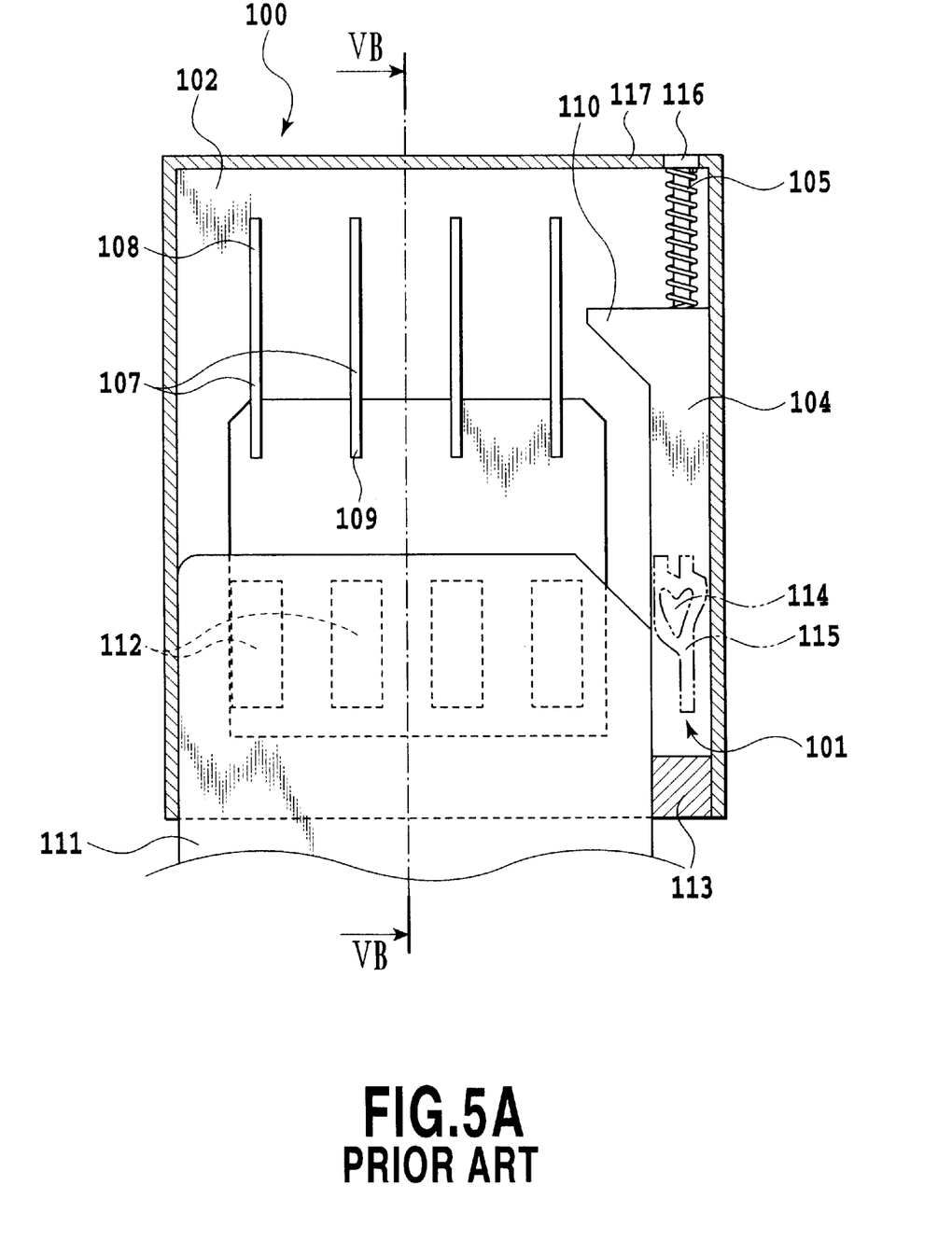
FIGS. 5A and 5B are schematic views of a conventional card connector, FIG. 5A representing a horizontal cross-sectional view and FIG. 5B representing a cross-sectional view taken along the line VB—VB of FIG. 5A.
Figure 5B:
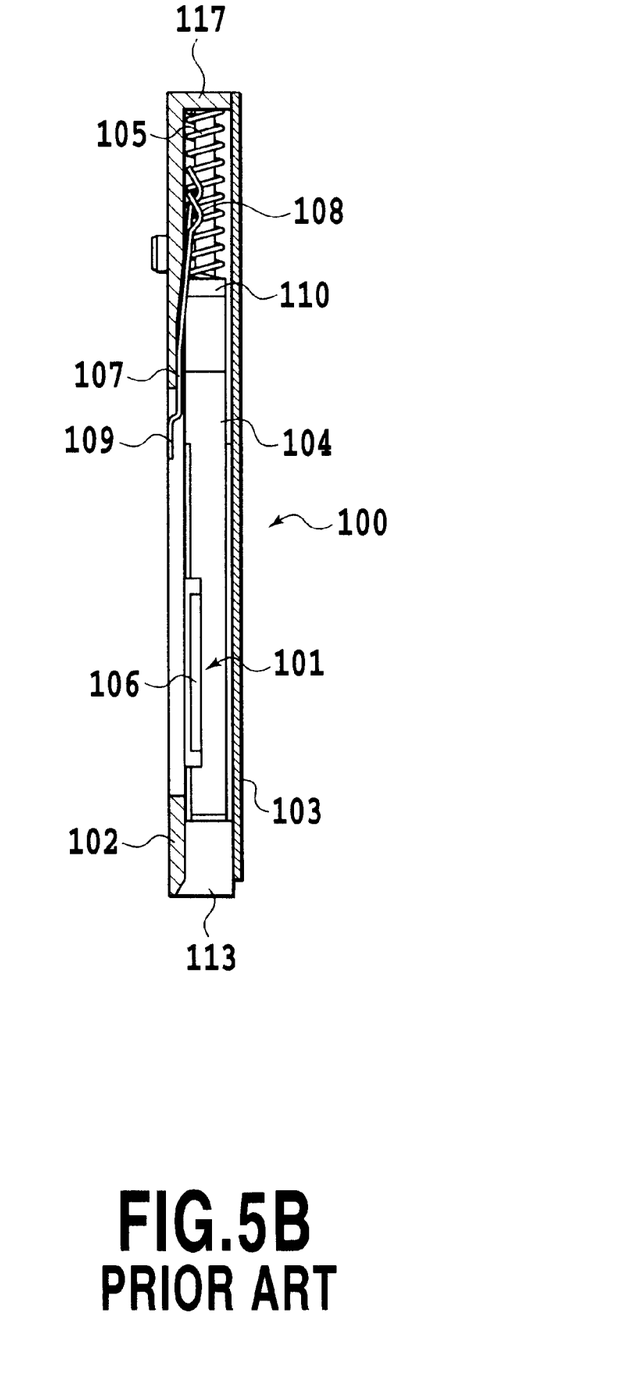

A conventional card connector will be explained by referring to FIGS. 5A and 5B. FIG. 5A is a schematic plan view of the card connector with its cover removed. FIG. 5B is a cross section taken along the line VB—VB of FIG. 5A.

The card connector 100 comprises a base plate 102 and a cover 103. At least the base plate 102 is formed from an insulating material of synthetic resin. The base plate 102 is provided with a plurality of contact terminals 107 to be brought into electrical contact with a plurality of electrode pads 112 arranged on a back surface of an IC card 111. The contact terminals 107 each have a spring portion 108 for contact with the associated electrode pad 112 of the IC card 111 and a terminal portion 109 soldered to an associated contact pad of the printed circuit board of the electronic device.

The card connector 100 has a push-push type card eject mechanism 101 along one side of the base plate 102. The card eject mechanism 101 includes an eject member 104 having a card engagement portion 110, a compression coil spring 105 for pushing the eject member 104 against a stopper 113 provided on the base plate 102 when the IC card 111 is not loaded, a heart cam 114 formed on the base plate 102, lever guide grooves 115 formed along and on both sides of the heart cam 114 to guide one end of a cam lever 106, and the cam lever 106 having its one end slide along the lever guide groove 115 and the other end secured to the eject member 104.

The card eject mechanism 101 is held between the stopper 113 of the base plate 102 at one end and a retainer fitting 116 press-fitted into a rear plate 117 of the base plate 102 at the other end.

In this card eject mechanism 101, when the IC card 111 is inserted into the card connector 100, the eject member 104 is pushed by the IC card 111 through the card engagement portion 110 toward a rear side of the card connector 100 against the force of the compression coil spring 105. At this time, one end of the cam lever 106 slides in one of the lever guide grooves 115 along the heart cam 114 and becomes locked by a recessed locking portion of the heart cam 114. As a result, the IC card is held immovable in the card connector 100, with the electrode pads 112 of the IC card 111 in contact with the contact terminals 107 of the card connector 100, thus electrically connecting the IC card 111 to the card connector 100.

When the card is to be ejected, a user slightly pushes the inserted IC card 111 toward the rear. This unlocks the cam lever 106 from the locking portion of the heart cam 114. As the result, the compression coil spring 105 forces the free end portion of the cam lever 106 to move through the other lever guide groove 115 along the heart cam 114 toward the front of the card connector. Thus the eject member 104 moves toward the front of the card connector 100, pushing the IC card 111 toward the front with the card engagement portion 110 and ejecting it from the card connector 100. (For details of the card eject mechanism, refer to Japanese Patent Application Laid-open Nos. 2000-251024 and 251025.)

In the card connector 100 of the construction described above, the terminal portions 109 of the contact terminals 107 are soldered to the contact pads of the printed circuit board of an electronic device. In recent years, this solder connection is realized by a reflow soldering because of the ease with which it can be processed.

The reflow soldering is done at an elevated temperature to melt the solder. Conventional card connectors are allowed a sufficient thickness so that the base plate, though made from resin, has adequate strength to withstand high-temperature processing. In recent years, however, there are growing demands for reduced size, thickness and weight of the card connectors. And the construction of the base plate forming the card connector is being stretched to its limit in terms of shape and size.

Under these circumstances, in a construction of the card connector in which the card eject mechanism pushed by the compression coil spring is held by the retainer fitting press-fitted in the resin base plate and by the stopper formed on the resin base plate, as in the conventional card connectors, since the card connector is subjected to high temperatures when the reflow soldering is performed, the resin base plate is softened with heat and thus the force of the compression coil spring may affect the retainer fitting, and the compression coil spring may fly out of the card connector.

SUMMARY OF THE INVENTION

An object of the present invention is to solve the above-described problem and provide a card connector which can prevent the retainer fitting from flying out even when a molded base plate (a resin base plate including the stopper) is softened during reflow soldering and which can be reduced in size, height and weight.

To achieve the above objective, the card connector of the present invention comprises a shell body and a molded base plate, wherein the molded base plate includes at least a card eject mechanism having a compression coil spring and adapted to insert and eject a card and a retainer fitting press-fitted in the base plate to hold the card eject mechanism pushed by the compression coil spring and wherein the shell body is formed with at least one engagement hole that engages at least one hook portion of the retainer fitting.

In the card connector of this invention, the retainer fitting includes a horizontal member and a vertical member vertically rising from the horizontal member. The horizontal member and/or the vertical member have at least a pair of press-fit projections and one hook portion.

Further, the retainer fitting includes a spring receiving portion for positioning the compression coil spring.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Embodiments of the present invention will be described in detail by referring to the accompanying drawings. The card connector of this invention is basically the same in structure as the conventional example described above.

Figure 1:
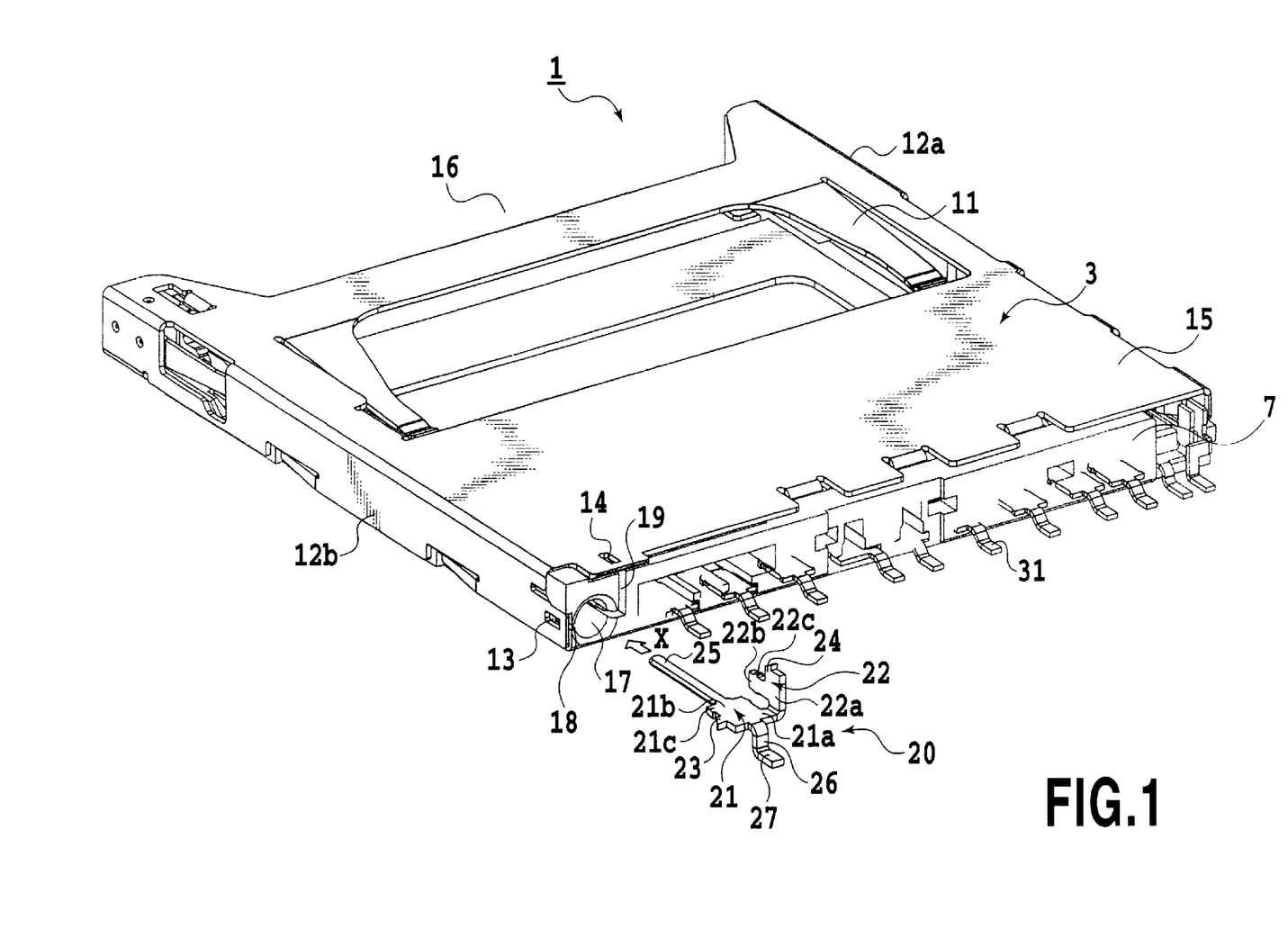
FIG. 1 is a perspective view showing a card connector and a retainer fitting according to the present invention.
Figure 2:
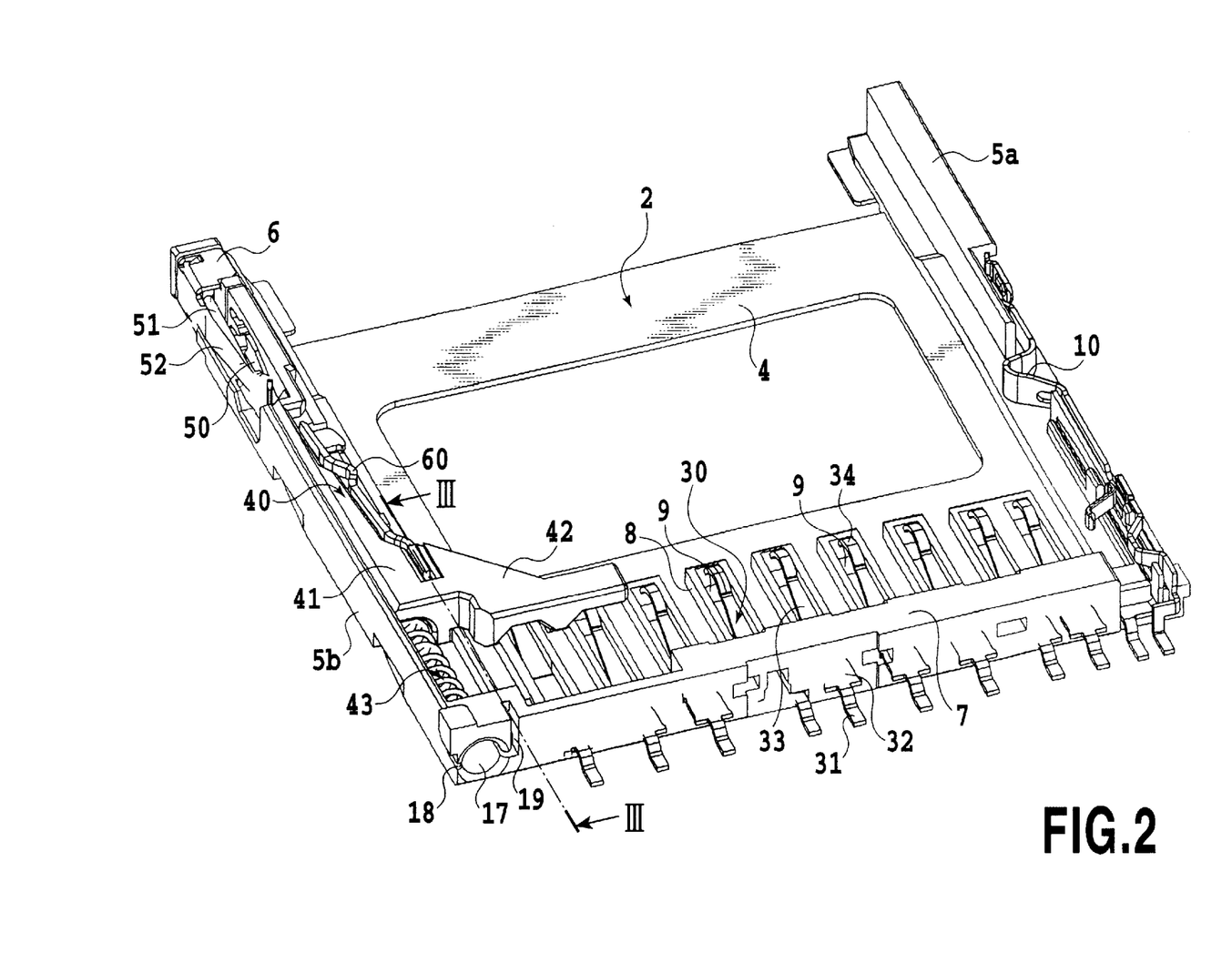
FIG. 2 is a perspective view showing an inner structure of the molded base plate of the card connector according to this invention with the shell body removed.

FIG. 1 is a perspective view of the card connector 1. FIG. 2 is a perspective view showing the inner structure of a lower housing (molded base plate) 2 with an upper housing (shell body) 3 removed.

The card connector 1 is mounted on electronic devices such as cell phones, PDAs, portable audio devices and cameras, and an IC card is inserted into the card connector 1 with its contact pad side down. The card connector 1 comprises a molded base plate 2 and a shell body 3. The molded base plate 2 is made from an insulating material such as resin and the shell body 3 from a processed sheet metal. The shell body 3 serves as a cover of the molded base plate 2 and also as a reinforcement for the card connector 1 as a whole.

The shell body 3 includes a top plate 15, left and right side plates 12a, 12b, and IC card retainer pieces 11. The side plate 12b and the top plate 15 are formed with engagement holes 13, 14, respectively, for engagement with a hook of a retainer fitting 20 described later.

The molded base plate 2, as shown in FIG. 2, includes a bottom plate 4, left and right side plates 5a, 5b, a stopper 6, a rear wall 7, a contact terminal mounts 8, and contact terminal fixing grooves 9 formed in the contact terminal mounts 8. A press-fit hole 17 into which the retainer fitting 20 described later is fitted under pressure is formed in the rear wall 7.

The stopper 6 is provided at the front of the molded base plate 2 (with respect to the IC card insertion direction) by the side of one side plate 5b and holds the eject member 41 pushed by a compression coil spring 43 toward the stopper 6.

The retainer fitting 20 is fitted under pressure into the press-fit hole 17 formed in the molded base plate 2 in an X direction (FIG. 1) and locked by the molded base plate 2 and the shell body 3 to hold the compression coil spring 43 in its place.

Fixed in the contact terminal fixing grooves 9 formed in the contact terminal mounts 8 are contact terminals 30 that electrically connect the IC card to the electronic device. The other side plate 5a of the molded base plate 2 is provided with a plurality of metal leaf springs 10 that constitute a write protect switch for detecting the position of a write protect button of the IC card.

The contact terminals 30 are each formed from a cantilevered metal leaf spring, which has a fixed portion 32 to be fixed in the contact terminal fixing groove 9, an elastically displaceable spring portion 33, an arc-shaped contact portion 34 protruding upward at the front end side of the spring portion 33 for engagement with an associated contact pad of the IC card, and a terminal portion 31 projecting rearward through the rear wall 7 and soldered to an associated contact pad of a printed circuit card of the electronic device. The terminal portions 31 extending rearward are so formed that their pad connecting surfaces are flush with one another.

A card eject mechanism 40 that performs insertion and ejection of an IC card is arranged on the side of one side plate 5b. The card eject mechanism 40 has a card engagement portion 42 extending into a card insertion space, an eject member 41 having a heart cam 50 shaped like a heart and formed in its side facing the one side plate 5b, a compression coil spring 43 urging the eject member 41 toward the stopper 6, an elastic locking piece 60 for preventing an IC card from slipping off when the IC card is inserted, a U-shaped cam lever 51 having one of its ends rotatable supported on the stopper 6 and the other end as a free end movable along the heart cam 50, and a lever retainer 52 formed in the side plate 5b to prevent a positional deviation of the cam-lever 51. In this embodiment, the heart cam 50 formed in the eject member 41 has its recessed locking portion directed toward the front of the card connector 1 (toward the stopper 6).

The heart cam 50 may be formed on the molded base plate 2 as in the conventional example described earlier. In that case, one end of the cam lever 51 is supported on the eject member 41. The card eject mechanism 40 may be provided on the side of the other side plate 5a, opposite to where it is arranged in this embodiment.

The insertion and ejection of an IC card by the card eject mechanism 40 are similar to those described in the above conventional example. However, a brief description will be given.

When an IC card is inserted into the card connector 1 from an insertion opening 16, the eject member 41 is pushed by the IC card through the card engagement portion 42 toward the rear side of the connector 1 (in the figure, toward the rear wall 7) against the force of the compression coil spring 43. At this time, the free end of the cam lever 51 slides along one side surface of the heart cam 50 and then fits into and is locked by the recessed locking portion of the heart cam 50. Now, the IC card is held immovable in the card connector 1, with the contact pads of the IC card in contact with the contact terminals 30 of the card connector 1.

When the IC card is to be ejected from the connector, the user pushes the inserted IC card slightly rearward. This unlocks the cam lever from the locking portion of the heart cam 50, allowing the eject member 41 to be moved toward the front of the card connector 1 (toward the insertion opening 16) by the force of the compression coil spring 43 until it is stopped by the stopper 6. As the eject member 41 is moved by the spring, the free end of the cam lever 51 slides along the other side surface of the heart cam. The forward movement of the eject member 41 forces the IC card toward the front by the card engagement portion 42 and ejects it from the insertion opening 16 of the card connector 1.

(First Embodiment)

Next, a first embodiment of the card connector according to the present invention will be explained by referring to FIG. 1 to FIG. 3.

Figure 3:
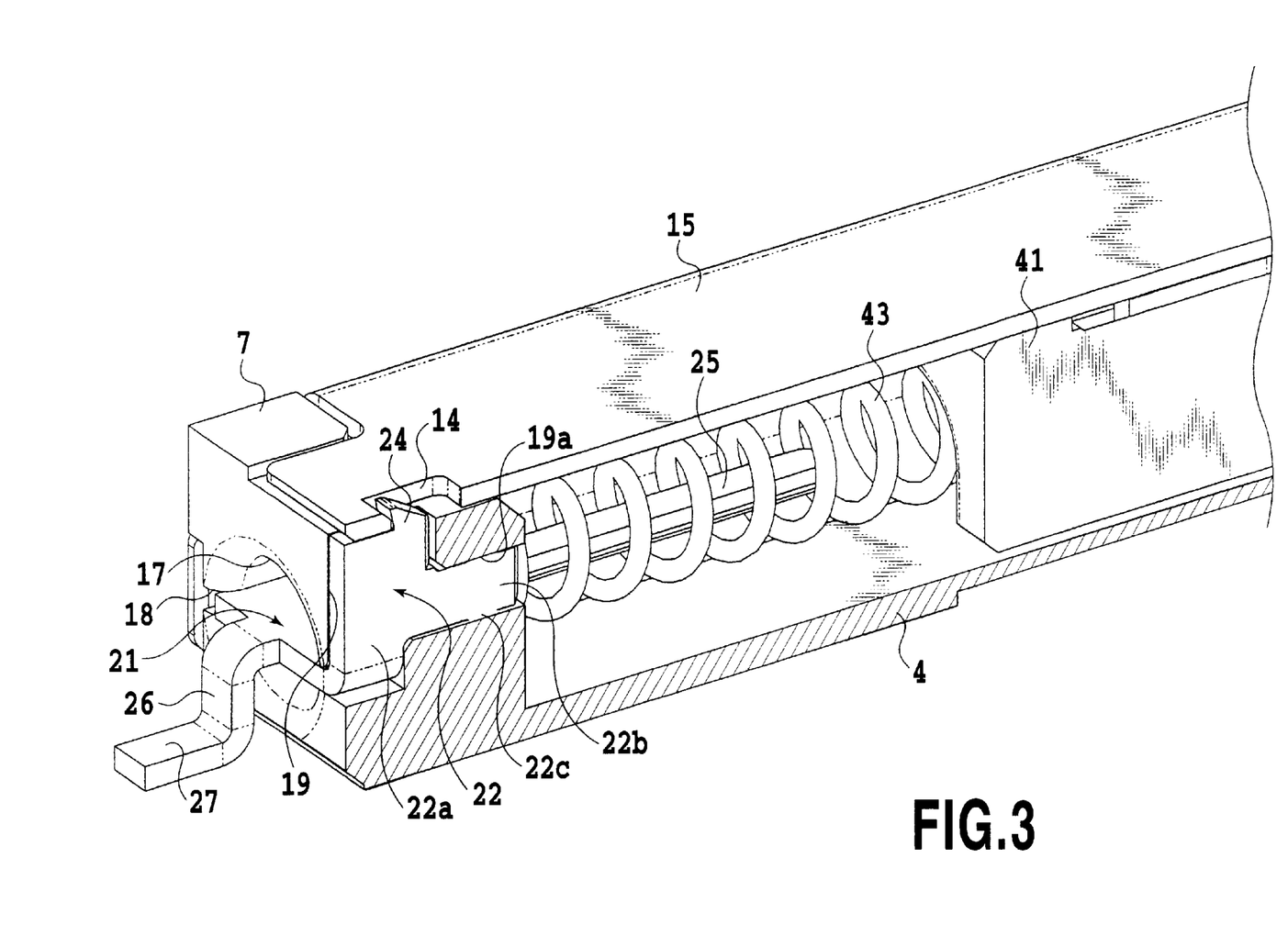
FIG. 3 is a cross-sectional view taken along the line III—III of FIG. 2 showing the retainer fitting assembled into the card connector according to this invention.

FIG. 3 is a cross-sectional perspective view of the first embodiment of this invention taken along the line III—III in FIG. 2, showing the retainer fitting 20 assembled into the molded base plate 2.

The retainer fitting 20, as shown in FIGS. 1 and 3, includes a horizontal member 21 having first press-fit projections 21c and a first hook portion 23, both extending horizontally, a spring receiving member 25 extending from the horizontal member 21 for positioning the compression coil spring 43, and a vertical member 22 rising vertically from the horizontal member 21 and having second press-fit projections 22c and a second hook portion 24. At least a pair of the first press-fit projections 21c are formed, one on each of the left and right sides of the horizontal member 21. At least a pair of the second press-fit projections 22c are formed, one on each of the top and bottom sides of the vertical member 22.

The horizontal member 21 and the vertical member 22 may be formed to have the same lengths in the insertion direction of the retainer fitting 20, i.e., in the direction of arrow X shown. The first hook portion 23 and the second hook portion 24 may have an inclined surface that inclines in the direction of X.

Further, the first hook portion 23 of the horizontal member 21 and the second hook portion 24 of the vertical member 22 may be formed on the same plane perpendicular to the X direction. Similarly, the first press-fit projections 21c of the horizontal member 21 and the second press-fit projections 22c of the vertical member 22 may be formed at positions in front of the first and second hook portions 23, 24 with respect to the X direction on the same plane perpendicular to the X direction.

The horizontal member 21 may be formed two-stepped in the X direction. The first hook portion 23 may be formed in a base portion 21a of the horizontal member 21 with a larger width. The first press-fit projections 21c may be provided at the left and right sides of a front end portion 21b of the horizontal member 21 with a smaller width. Similarly, the vertical member 22 may be formed two-stepped in the X direction. The second hook portion 24 may be formed in a base portion 22a of the vertical member 22 with a larger height. The second press-fit projections 22c may be provided at the top and bottom sides of a front end portion 22b of the vertical member 22 with a smaller height.

With the retainer fitting 20 formed in this way, it can more easily be fitted into the molded base plate 2 and thus more firmly supported by the molded base plate 2 and the shell body 3. The retainer fitting 20 can also be manufactured with a greater ease.

The rear wall 7 of the molded base plate 2 is formed with a press-fit hole 17 into which the front end portion 21b of the horizontal member 21 of the retainer fitting 20 is fitted under pressure, a horizontal groove 18 into which the base portion 21a of the horizontal member 21 is inserted, an L-shaped groove 19 into which the base portion 22a of the vertical member 22 continuous with the base portion 21a of the horizontal member 21 is inserted, and a press-fit hole 19a continuous with the L-shaped groove 19 into which the front end portion 22b of the vertical member 22 is fitted under pressure.

The side plate 12b and the top plate 15 of the shell body 3 are formed with a first engagement hole 13 and a second engagement hole 14 that match the first hook portion 23 and the second hook portion 24 of the retainer fitting 20 respectively when the retainer fitting 20 is fitted into the molded base plate 2.

After the shell body 3 is assembled to the molded base plate 2, the retainer fitting 20 is press-fitted into the molded base plate 2. More specifically, the front end portion 21b of the horizontal member 21 of the retainer fitting 20 is fitted under pressure into the press-fit hole 17 while collapsing the first press-fit projections 21c formed at the both sides of the front end portion 21b by the wall of the press-fit hole 17 in the molded base plate 2. Likewise, the front end portion 22b of the vertical member 22 of the retainer fitting 20 is fitted under pressure into the press-fit hole 19a while collapsing the second press-fit projections 22c formed at the top and bottom sides by the wall of the press-fit hole 19a in the molded base plate 2.

As soon as this press-fitting operation is completed, the first hook portion 23 and the second hook portion 24 formed in the horizontal member 21 and the vertical member 22 of the retainer fitting 20 engage the first engagement hole 13 and the second engagement hole 14 formed in the side plate 12b and the top plate 15 of the shell body 3, respectively. Now, the assembly of the card connector 1 is complete.

(Second Embodiment)

Next, a second embodiment of the card connector according to the present invention will be described by referring to FIG. 4.

Figure 4:
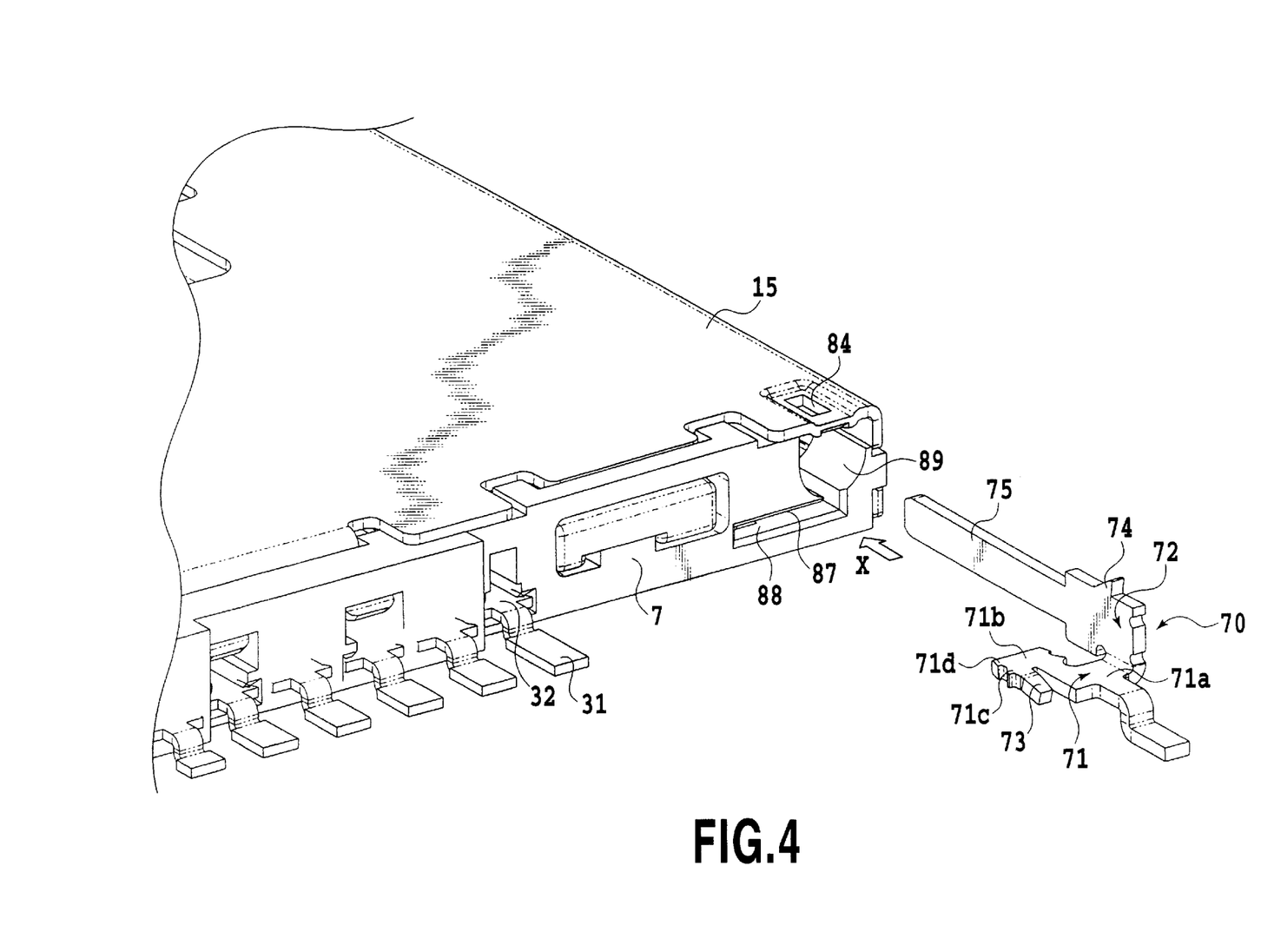
FIG. 4 is an essential-part enlarged view showing another embodiment of the invention.

FIG. 4 is an essential-part enlarged view of the second embodiment of the invention, showing the state of a retainer fitting 70 before being assembled into the molded base plate 2. In this embodiment, the retainer fitting 70 is press-fitted into the rear wall 7 of the molded base plate 2 on a side opposite to where it is fitted in the first embodiment.

The retainer fitting 70, as shown in FIG. 4, includes a horizontal member 71 having projections 71c, 71d and first hook portion 73, both extending in the horizontal direction, a vertical member 72 vertically rising from the horizontal member 71 and having a second hook portion 74 extending in the vertical direction, and a spring receiving member 75 extending from the vertical member 72 for positioning the compression coil spring 43.

The horizontal member 71 has at least one pair (in this embodiment, two pairs) of projections 71c, 71d, one at each of left and right sides of a front end portion 71b. Unlike the first hook portion in the first embodiment, the first hook portion 73 of the horizontal member 71 in this embodiment is urged horizontally outward with a spring force.

The rear wall 7 of the molded base plate 2 is formed with a press-fit hole 87 continuous with a horizontal groove 88 described later into which the front end portion 71b of the horizontal member 71 of the retainer fitting 70 is fitted under pressure, a horizontal groove 88 into which a base portion 71a of the horizontal member 71 is inserted, an insertion hole 89 into which the vertical member 72 is inserted, and an engagement projection (not shown) in the horizontal groove 88 which the first hook portion 73 engages.

The top plate 15 of the shell body 3 is formed with an engagement hole 84 that matches the second hook portion 74 of the retainer fitting 70 when the retainer fitting 70 is press-fitted into the molded base plate 2.

After the shell body 3 is assembled to the molded base plate 2, the retainer fitting 70 is press-fitted into the molded base plate 2. More specifically, the front end portion 71*b* of the horizontal member 71 of the retainer fitting 70 is fitted under pressure into the press-fit hole 87 while collapsing the paired projections 71*c*, 71*d* on both sides of the front end portion 71*b* by the wall of the press-fit hole 87 in the molded base plate 2.

As soon as this press-fitting operation is completed, the first hook portion 73 and the second hook portion 74 formed on the horizontal member 71 and the vertical member 72 of the retainer fitting 70 engage the engagement projection formed in the molded base plate 2 and the engagement hole 84 formed in the top plate 15 of the shell body 3, respectively. Now the assembly of the card connector 1 is complete.

In the card connector of the present invention, since the retainer fitting for holding the compression coil spring in the card eject mechanism is locked at one location at least by the metal shell body, even when the holding of the molded base plate with the retainer fitting, which is press-fitted into the molded base plate, becomes loose at elevated temperatures during reflow soldering, the metal shell body holding the retainer fitting can prevent the compression coil spring from coming off. Therefore, further reductions in size, height and weight of the card connector of this invention are possible.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A card connector comprising:
   a shell body; and
   a molded base plate, wherein the molded base plate includes at least:
      a card eject mechanism incorporating a compression coil spring for inserting/ejecting a card; and
      a retainer fitting for holding the card eject mechanism pushed by the compression coil spring, wherein the retainer fitting includes:
         a horizontal member that has at least one pair of press-fit projections and one hook portion; and
         a vertical member rising vertically from the horizontal member;
   wherein the shell body is formed with at least one engagement hole for engagement with at least one hook portion of the retainer fitting.

2. A card connector comprising:
   a shell body; and
   a molded base plate, wherein the molded base plate includes at least:
      a card eject mechanism incorporating a compression coil spring for inserting/ejecting a card; and
      a retainer fitting for holding the card eject mechanism pushed by the compression coil spring, wherein the retainer fitting includes:
         a horizontal member; and
         a vertical member rising vertically from the horizontal member, wherein the vertical member has at least one pair of press-fit projections and one hook portion;
   wherein the shell body is formed with at least one engagement hole for engagement with at least one hook portion of the retainer fitting.

3. A card connector comprising:
   a shell body; and
   a molded base plate, wherein the molded base plate includes at least:
      a card eject mechanism incorporating a compression coil spring for inserting/ejecting a card, wherein the card eject mechanism further includes an eject member having a card engagement portion and being able to be moved against a force of the compression coil spring, a heart cam for restricting a movement and stopping of the eject member, and a cam lever to slide along the heart cam to restrict the movement and stopping of the eject member; and
      a retainer fitting for holding the card eject mechanism pushed by the compression coil spring;
   wherein the shell body is formed with at least one engagement hole for engagement with at least one hook portion of the retainer fitting.

4. A card connector as claimed in claim 3, wherein the heart cam is formed in the eject member.

5. A card connector as claimed in claim 3, wherein the heart cam is formed on the molded base plate.

* * * * *